US009098815B2

(12) United States Patent
Li et al.

(10) Patent No.: US 9,098,815 B2
(45) Date of Patent: Aug. 4, 2015

(54) PRESENTATION OF AN INTERACTIVE USER INTERFACE

(75) Inventors: Jingni Li, Charlotte, NC (US); Benjamin T. Teal, Charlotte, NC (US); Lisa E. Matthews, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 468 days.

(21) Appl. No.: 13/106,932

(22) Filed: May 13, 2011

(65) Prior Publication Data

US 2012/0290989 A1    Nov. 15, 2012

(51) Int. Cl.

| | | |
|---|---|---|
| *G06F 3/048* | (2013.01) | |
| *G06Q 10/04* | (2012.01) | |
| *G06Q 10/06* | (2012.01) | |
| *G06Q 20/36* | (2012.01) | |
| *G06F 21/57* | (2013.01) | |
| *G06Q 20/38* | (2012.01) | |

(52) U.S. Cl.
CPC .......... *G06Q 10/04* (2013.01); *G06Q 10/0635* (2013.01); *G06F 21/577* (2013.01); *G06Q 20/3674* (2013.01); *G06Q 20/382* (2013.01)

(58) Field of Classification Search
CPC ... G06F 3/0481; G06F 3/0482; G06F 9/4443; G06F 21/577; G06Q 20/382; G06Q 20/3674
USPC ....................................................... 715/853
See application file for complete search history.

(56) References Cited

U.S. PATENT DOCUMENTS

| | | | |
|---|---|---|---|
| 7,096,502 B1* | 8/2006 | Fox et al. ........................ 726/25 |
| 8,321,944 B1* | 11/2012 | Mayer et al. ..................... 726/25 |
| 2008/0140655 A1* | 6/2008 | Hoos et al. ........................ 707/6 |
| 2008/0263022 A1* | 10/2008 | Kostorizos et al. ............... 707/5 |
| 2008/0301120 A1* | 12/2008 | Zhu et al. .......................... 707/5 |
| 2010/0030618 A1* | 2/2010 | Green et al. .................... 705/10 |
| 2010/0169137 A1* | 7/2010 | Jastrebski et al. ................ 705/7 |
| 2011/0054961 A1* | 3/2011 | DelZoppo et al. ................ 705/7 |
| 2012/0036255 A1* | 2/2012 | Polsky .......................... 709/224 |

OTHER PUBLICATIONS

Heer et al. "prefuse: A Toolkit for Interactive Information Visualization", CHI 2005, Apr. 2007, USA, copyright 2005 ACM.*
Yang et al. "A Visual-Analytic Toolkit for Dynamic Interaction Graphs", KDD'08, Aug. 24-27, USA, copyright 2008 ACM.*
Brandes & Wagner "Visone: Analysis and Visualization of Social Networks", Mathematics and Visualization 2004, pp. 321-340, Link. Springer.com.*

(Continued)

*Primary Examiner* — Tuyetlien Tran
*Assistant Examiner* — Jaime Duckworth
(74) *Attorney, Agent, or Firm* — Banner & Witcoff, Ltd.; Michael A. Springs (57) ABSTRACT

Examples of a user interface are described that may include a master risk landscape map that includes nodes representing risks and links representing correlations between the risks. The visual appearance of the nodes and links may provide information about their characteristics, such as risk likelihood, risks severity, risk detectability, and/or strength of interconnectivity. The user may be able to interact with the master risk landscape map to drill down to further detail while simultaneously removing less relevant information as desired, thereby potentially allowing the user to focus on the most relevant information.

8 Claims, 4 Drawing Sheets

(56) References Cited

OTHER PUBLICATIONS

"An Integrated Risk Management Tool and Process", Jeevan Perera, Jerry Hosomback, IEEEAC, paper#1389, Nov. 29, 2004.*

Tom Hollander "Creating multi-series Bubble Charts in Excel", Mar. 27, 2011, p. 1-3.*

* cited by examiner

PRESENTATION OF AN INTERACTIVE USER INTERFACE

BACKGROUND

The art of risk management typically involves making sense of a large amount of information about risks, as well as their causes, relationships, and relative importance. While computers can often calculate inputted information with ease, it has become increasingly challenging to present increasingly complex and large amounts of risk-related information to human users without overwhelming them.

A traditional way to measure and document risk may be through the use of a spreadsheet with multiple tables, columns, and rows, similar to a FEMA template. However, once documentation is complete, users interpreting the information may feel that the focus of the information may have been buried among large quantities of data. Accordingly, user may not have a clear picture of various risks, their importance, and their correlation.

SUMMARY

Various examples of a risk management system, method, and software are described herein that may be able to present risk-related information to a human user in a meaningful and helpful way. In particular, one or more user interfaces may be presented to a user by a computer, and that may allow a risk management team to better understand the level of interconnection among risks and make appropriate decisions from this information. Such a user interface may provide a tool for robustly documenting risks, and for visually communicating their characteristics such as likelihood, severity, detectability, and/or domain, as well as the interrelations between the risks. The awareness of the interconnection of risks may then be weaved into decision-making for key areas such as people, processes, regulations, technology, operations, and/or environment.

For instance, the user interface may include a master risk landscape map that includes nodes representing risks and links representing correlations between the risks. The visual appearance of the nodes and links may provide information about their characteristics, such as risk likelihood, risks severity, risk detectability, and/or strength of interconnectivity. The user may be able to interact with the master risk landscape map to drill down to further detail while simultaneously removing less relevant information as desired, thereby potentially allowing the user to focus on the most relevant information.

Some aspects as described herein are directed to a computer comprising a processor and a non-transitory computer-readable medium storing computer-executable instructions for causing the computer to perform steps, and further storing data representing a correlation between each of a plurality of pairs of risks. The steps may include generating a first user interface of a plurality of nodes and a plurality of links between the nodes, wherein each of the nodes represents one of the risks and each of the links represents one of the correlations, and causing the first user interface to be displayed on a display device.

Further aspects are directed to a method, which may be implemented by computer-executable instructions stored on a non-transitory computer-readable medium. The method may include determining, for each of a plurality of pairs of risks, correlations between the respective pair of risks; generating, by a computer, a first user interface of a plurality of nodes and a plurality of displayed links the nodes, wherein each of the nodes represents one of the risks and each of the links represents one of the correlations, and displaying, on a display device, the first user interface.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Various example embodiments of a user interface are described herein. The user interfaces may be generated and/or displayed by, e.g., a computer. A computer may include any electronic, electro-optical, and/or mechanical device, or system of multiple physically separate such devices, that is able to process and manipulate information, such as in the form of data. Non-limiting examples of a computer include one or more personal computers (e.g., desktop, tablet, or laptop), servers, smart phones, personal digital assistants (PDAs), television set top boxes, service gateway devices, digital video recorders, mobile video devices, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions, such as a network router.

Figure 1:
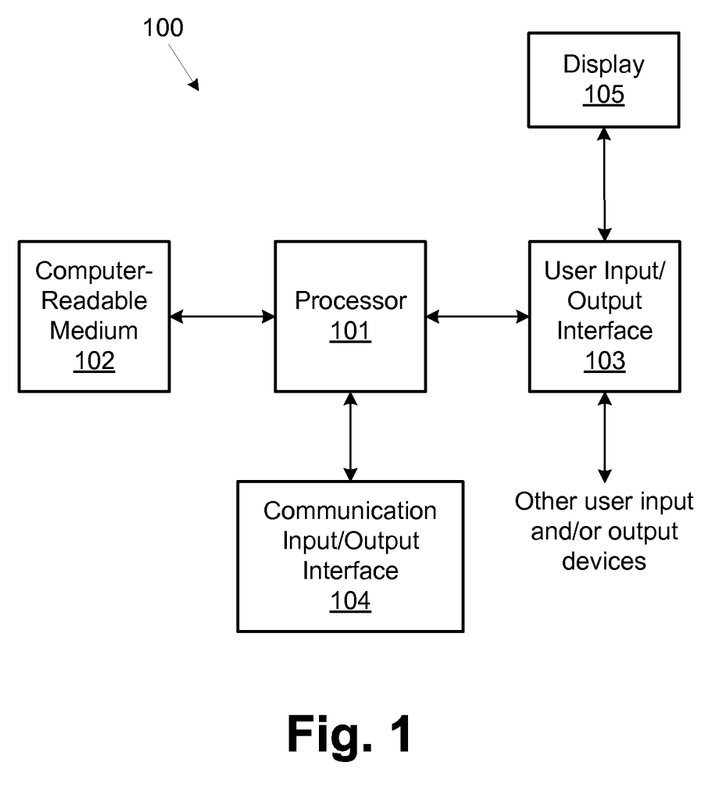
FIG. 1 is a functional block diagram of an example computer that may embody or implement one or more elements or functions as described herein.

An example functional-block representation of a computer 100 is shown in FIG. 1. Computer 100 may include hardware that may execute software to perform specific functions. The software, if any, may be stored on a computer-readable medium 102 in the form of computer-readable instructions. Computer 100 may read those computer-readable instructions, and in response perform various steps as defined by those computer-readable instructions. Thus, any functions and operations attributed to a computer and/or a user interface may be implemented, for example, by reading and executing such computer-readable instructions for performing those functions, and/or by any hardware subsystem (e.g., a processor 101) from which computer 100 is composed. Additionally or alternatively, any of the above-mentioned functions and operations may be implemented by the hardware of computer 100, with or without the execution of software.

Computer-readable medium 102 may include not only a single physical non-transitory medium or single type of such medium, but also a combination of one or more such media and/or types of such media. Examples of computer-readable medium 102 include, but are not limited to, one or more memories, hard drives, optical discs (such as CDs or DVDs), magnetic discs, and magnetic tape drives. Computer-readable medium 102 may be physically part of, or otherwise accessible by, computer 100, and may store computer-readable data representing computer-executable instructions (e.g., software) and/or non-executable data.

Computer 100 may also include a user input/output interface 103 for receiving input from a user via a user input device (e.g., a keyboard, a mouse, touch-sensitive display, and/or a remote control) and providing output to the user via a user output device (e.g., a display device 105, an audio speaker, and/or a printer). Display device 105 may be any device capable of presenting information for visual consumption by a human, such as a television, a computer monitor or display, a touch-sensitive display, or a projector. Computer 100 may further include a communication input/output interface 104 for communicating with devices external to computer 100, such as with other computers and/or other nodes in a network.

Computer 100 may be used to generate and/or display one or more user interfaces. The user interfaces may present risk assessment information in a way that may be considered extremely useful, such as by presenting a visualization of complex correlations between risks, simultaneously with a visualization of characteristic score data of those risks. For instance, one or more of the user interfaces may dynamically generate an interactive graphical map indicating interconnections between various risks, as well as one or more characteristics of those risks such as risk likelihood, risk severity, and/or the ability for an event associated with a risk to be detected. The user may be able to interact with the map to study the interconnections in isolation and/or in greater detail. Using such a map may potentially facilitate decision making to focus on managing systemic risks more effectively, by vividly demonstrating the interconnection between selected risks and the likelihood and/or severity of those risks themselves. In doing so, the user interface may raise the user's awareness and/or recognition of the interconnection among risks, and may be used as a presentation tool to engage audiences by allowing the user to drill down into the details of different risks and their interactions in the interactive map. Such an interactive dynamic risk map may be useful to a variety of audiences, such as business controls monitoring and readiness teams, strategic planning organizations, line-of-business units, occupancy planning units, and planning directors. Moreover, the computer and/or user to leverage pair-wise comparison in defining weights for different attributes when calculating risk scores.

Risks may be identified by one or more characteristics, each characteristic having a score. As discussed above, the characteristics of each risk may include risk likelihood, risk severity, and/or the ability for an event associated with a risk to be detected. In addition, risks may be interconnected together. For instance, the occurrence of an event associated with a first risk may affect the likelihood of occurrence of, severity of, and/or ability to detect, an event associated with a second risk. Table 1 below shows example data that may define characteristic scores, and Table 2 below shows example data that may define the interconnectivity, or correlation, of various risks. This data may be stored in, e.g., computer-readable medium 102.

TABLE 1

| Risk ID | Risk | Risk Description | Domain | Likelihood | Severity | Detection |
|---|---|---|---|---|---|---|
| 1 | Capacity Constraints | Not providing sufficient staffing according to requirements of the business which prevents delivering products or services to our customers that will meet or exceed needs or competition. | People | 5 | 3 | 5 |
| 2 | Hours Worked | The number of continuous hours worked by associates without time off. | People | 8 | 5 | 6 |
| 3 | Cyber Attacks & Crime | The inability to detect, prevent, pinpoint and/or mitigate increasing transnational attacks on Company interests. | Technology | 8 | 9 | 8 |
| ... | ... | ... | ... | ... | ... | ... |

TABLE 2

| Risk ID | 1 | 2 | 3 | 4 | 5 | 6 | 7 | 8 | ... |
|---|---|---|---|---|---|---|---|---|---|
| 1 | — | 7 | 0 | 0 | 7 | 9 | 9 | 9 | ... |
| 2 | — | — | 9 | 7 | 0 | 9 | 9 | 5 | ... |
| 3 | — | — | — | 0 | 0 | 9 | 7 | 7 | ... |
| 4 | — | — | — | — | 7 | 5 | 1 | 5 | ... |
| ... | ... | ... | ... | ... | ... | ... | ... | ... | ... |

A user interface may be presented by computer 100 that may allow a user to enter the information such as in Tables 1 and 2, and to present information from the entered/stored data in a useful format. The user interface may further be interactive, allowing the user to request that additional details about the data be presented and/or focused upon by the user interface. In some embodiments, the user interface may display multiple input fields (e.g., text entry fields) in a tabular format such as that shown in Tables 1 and 2. In such a case, the user may enter the data directly into the input fields representing one or more attributes of the risks (such as any of the attributes represented by the various columns of Table 1) and/or one or more attributes of the correlations between the risks (such as the correlation strengths between risk pairs as shown in Table 2), such as by using a keyboard and/or a mouse. In further embodiments, the data may be entered in a different manner and/or imported from a separate source, such as a computer-readable medium storing the data in a predetermined format.

Figure 2:
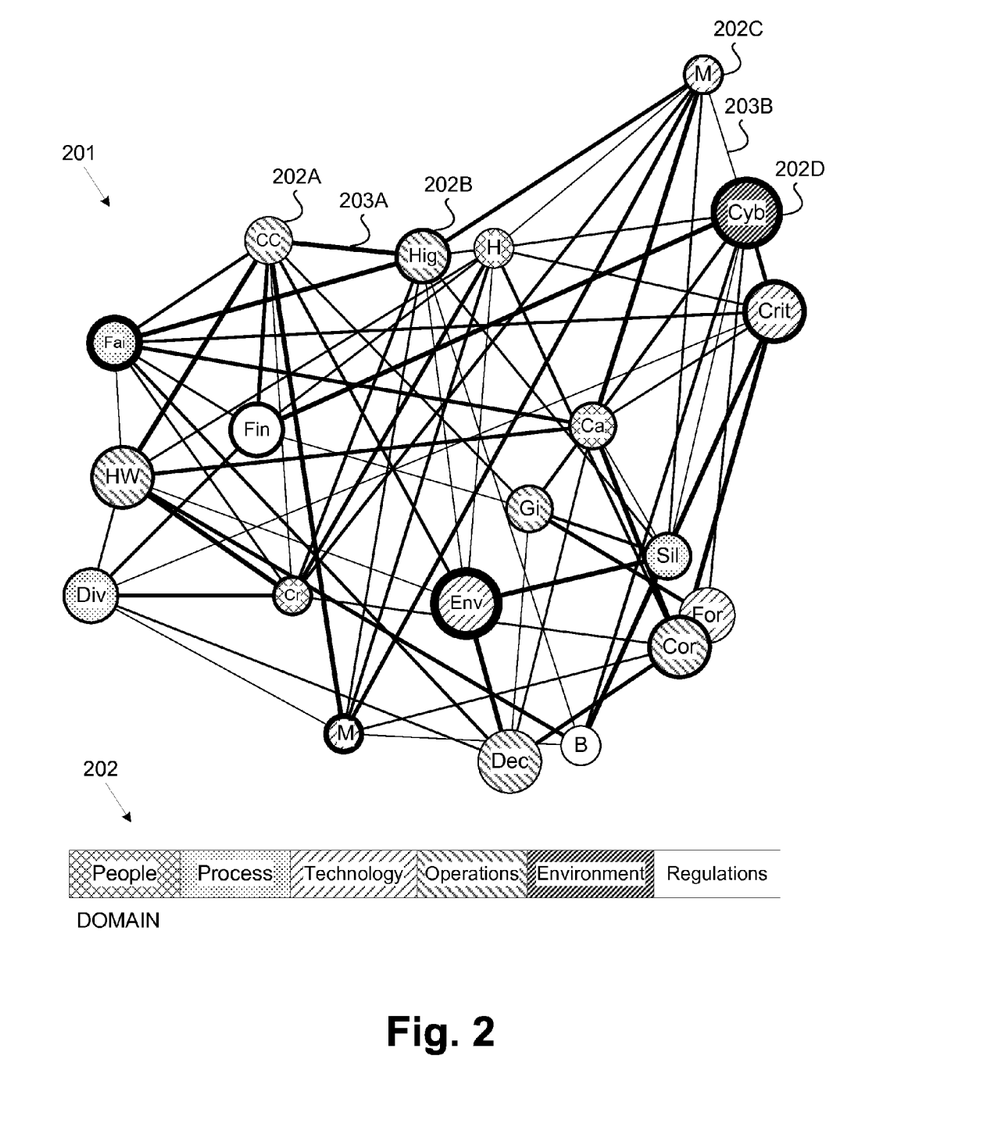
FIG. 2 is an example user interface as may be displayed to the user, which includes an example interactive master risk landscape map.

FIG. 2 shows an example of such a user interface that presents the stored data in a useful format. In this example, the user interface includes a dynamic risk landscape map 201 that is graphically displayed to the user, such as by display device 105. The dynamic risk map in this example may include a plurality of nodes (e.g., nodes 202A, 202B, 202C, and 202D) and a plurality of links (e.g., links 203A and 203B) interconnecting the nodes. Each of the nodes may represent one of the risks, and each of the links may represent a correlation between a pair of the risks. For example, nodes 202A ("CC") and 202B ("Hig") are correlated with each other via link 203A.

The nodes may each include a graphical and/or textual label indicating which risk is represented. For instance, node 202A includes the indication of "CC," which in this example may represent the risk of Capacity Constraints (see Table 1). As another example, the node labeled "HW" may represent the risk of Hours Worked (see Table 1). Any indication may be used to identify which risk is associated with each node, such as the risk name or abbreviation, risk ID. Additionally or alternatively, the appearance of the node may indicate which risk is represented, such as by the node being displayed as, or otherwise including, a particular picture, a particular color, a particular pattern, a particular size, and/or a particular shape.

The nodes may further include a graphical and/or textual indication of which risk domain or other risk category is associated with that node. For example, the appearance of the node may indicate the associated risk domain, such as by the node being displayed as, or otherwise including, a particular picture, a particular color, a particular pattern, a particular size, and/or a particular shape. In the present example, the possible domains are People, Process, Technology, Operations, Environment, and Regulations. However, any set of domains or other categories may be used. Also, in this example, each domain is represented by a different pattern or color.

Figure 3:
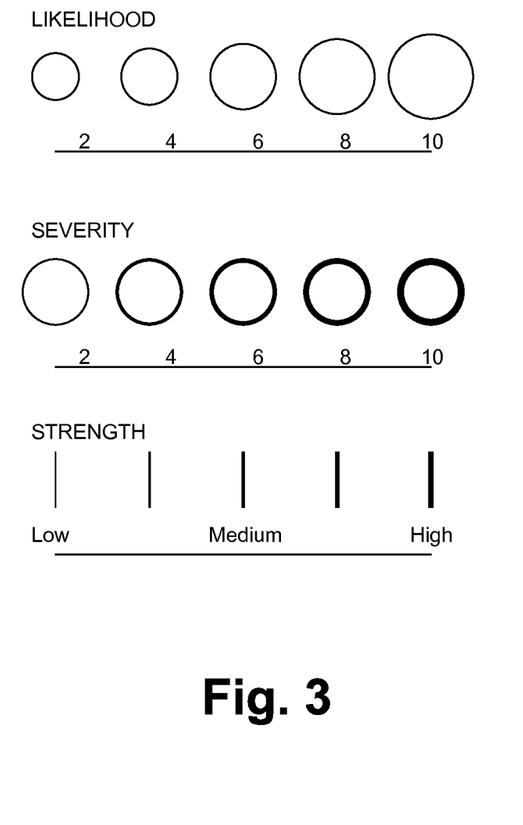
FIG. 3 is another example user interface as may be displayed to the user.

The nodes may further include a textual and/or graphical indication of the likelihood, severity, and/or detection scores indicated by the stored data (e.g., the data of Table 1). For example, the appearance of the node may indicate any or all of these three features, such as by the node being displayed as, or otherwise including, a particular picture, a particular color, a particular pattern, a particular size, and/or a particular shape. In the particular example shown in FIG. 2, the outer size of the node indicates the likelihood of the associated risk, and the thickness of the outer ring of the node indicates the severity of the associated risk. In other examples, these may be reversed such that the outer size of the node indicates the severity of the associated risk, and the thickness of the outer ring of the node indicates the likelihood of the associated risk. FIG. 3 shows an example scale of how a node of a fixed severity may appear at different likelihoods, and also how a node of a fixed likelihood may appear at different severities. Again, this is merely an example, and any other node appearance characteristics may be used to indicate likelihood, severity, and/or detection. Also, while the nodes are shown in this example as circles, the nodes may be of any shape or shapes as desired.

The appearance and/or labeling of the links in the user interface may provide information about various characteristics of the links. For example, in the present example of FIG. 2, the thickness of each link represents the strength of the correlation (e.g., the correlation score in Table 2) between the node pairs that are interconnected by the link. FIG. 3 shows an example scale of how a link may appear at different correlation scores. The stronger the correlation, the thicker the link. Again, this is merely an example, and any other link appearance characteristics may be used to indicate the correlation strength. For instance, the color and/or shape of the link as displayed in the user interface may indicate the correlation strength. Also, while the links are shown in this example as solid lines, they may appear as broken lines, curves, arrows, and/or any other shape.

The nodes may be arranged in the user interface in any manner desired. For instance, the nodes may be randomly distributed across an area of the display. In such a case, the user interface may be configured to ensure that one node does not unduly obscure another node from view. In other examples, the nodes may be arranged in accordance with one or more characteristics of the risks associated with the nodes. For example, the nodes may be distributed horizontally in accordance with their associated likelihoods and vertically in accordance with their associated severities (or vice versa).

Figure 4:
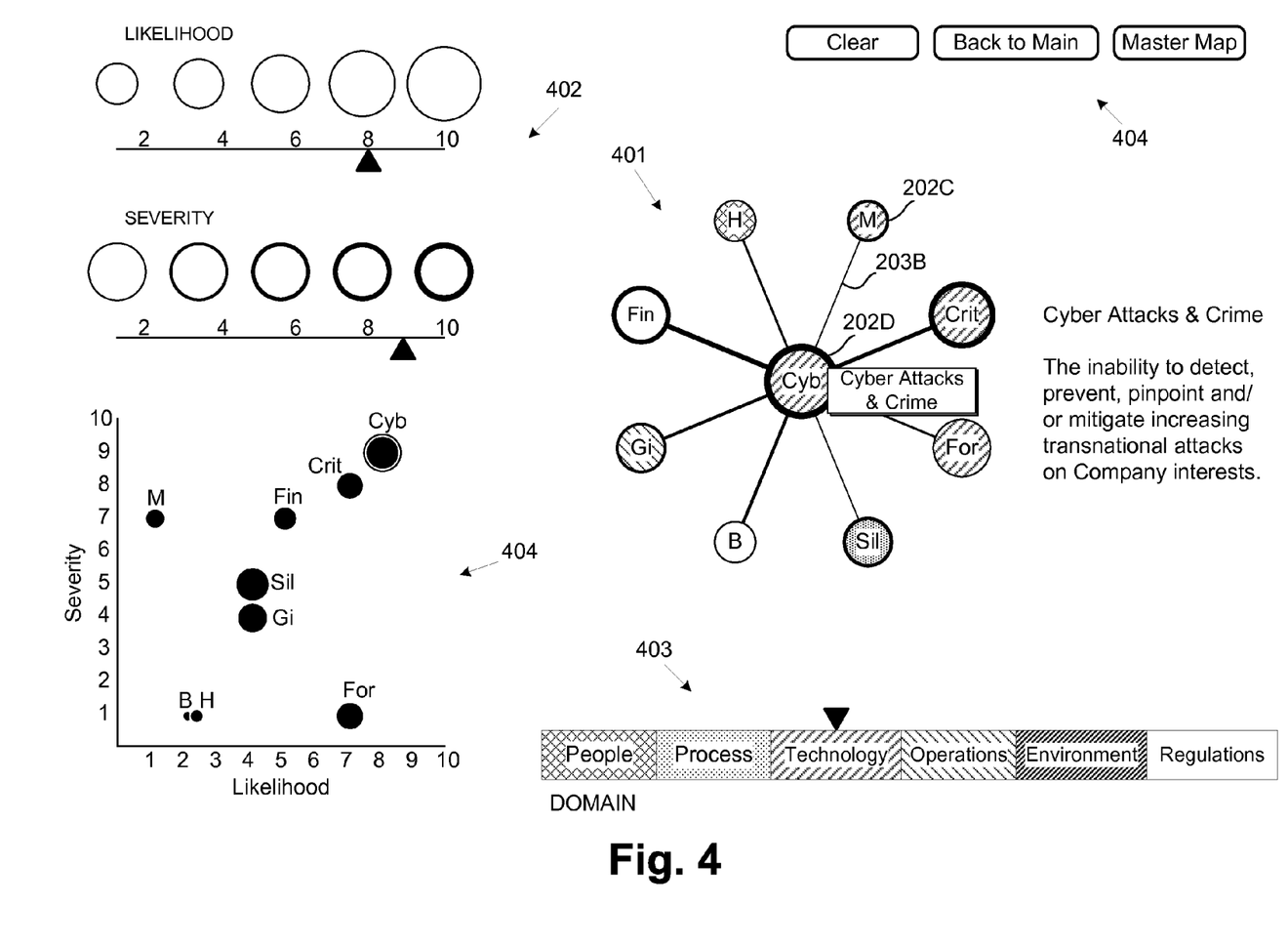
FIG. 4 is yet another example user interface as may be displayed to the user, and that may be displayed as a result of interactivity with the FIG. 2 user interface.

The user interface of FIG. 2 may also be interactive. That is, the user may be able to provide input to the user interface, and the user interface may respond by displaying different and/or additional information. For example, if the user selects one of the nodes of FIG. 2 (such as by hovering over or clicking on the node using a mouse, or selecting the node via a keyboard input or touch screen interface), in response the user interface may present more detailed information related to the selected node, while also no longer including information about some of the other nodes. An example of such a user interface is shown in FIG. 4. In this example, the user has selected the "Cyb" node, which corresponds to Risk ID 3 (Cyber Attacks & Crime) of Tables 1 and 2.

Responsive to the user selecting the "Cyb" node from the user interface of FIG. 3, the FIG. 4 user interface may be generated, showing information for, e.g., only the selected node and any other nodes correlated with (having a link with) the selected node. For example, where the "Cyb" node has been selected, then the FIG. 4 user interface may show a map 401 of only the Cyb node and those nodes linked to the Cyb node (in this example, the nodes labeled Fin, H, M, Crit, For, Sil, B, and Gi). Also, in this example, the selected node may be presented in the map 401 so as to be surrounded by the other linked nodes. In the present example, the selected Cyb node is shown in the map 401 at the center of a circle, and the nodes linked to the Cyb node are shown arranged around the perimeter of the circle. This is merely an example; other arrangements may be used.

Where the user further selects one of the nodes displayed in map 401 (e.g., by hovering over, clicking on, or touching the node), an indicator 402 may indicate the likelihood and severity of the further selected node. For instance, responsive to the user selecting the Cyb node in the FIG. 4 user interface, the user interface may cause indicator 402 to indicate that (in this example) the likelihood of the risk associated with the Cyb node is 8 and that the severity of the risk associated with the Cyb node is 9. Although indicator 402 in this example indicates the likelihood and severity of the selected node, indicator 402 may, in other example, indicate any one or more of the likelihood, severity, and/or detection scores of the selected node. In addition, when a node is selected in the FIG. 4 user interface, the user interface may further present a description of the selected node, which may be taken from, e.g., the Risk Description field of Table 1.

Also, when the user selects one of the nodes in the FIG. 4 user interface, another indicator 403 may indicate which domain or other category the risk associated with the selected node belongs to. In the present example, indicator 403 indicates that the selected Cyb node belongs to the Technology domain. This information may be taken from, e.g., the Domain field of Table 1.

The FIG. 4 user interface may also include a risk landscape map 404, which may present the nodes of map 401 in a different way. For example, in risk landscape map 404, the nodes are distributed along perpendicular Likelihood and Severity axes of a chart, according to their associated likelihood and severity scores. Also, in this example, the size of each node in map 404 may be based on a combination of any two of, or all three of, the likelihood, severity, and detection scores of the associated node. For example, the size of each node may be based on a weighted or non-weighted sum, average, or multiplication of all three of the likelihood, severity, and detection scores, while the position of each node on map 404 may be based only on a subset of the three scores, such as the likelihood and severity scores. In other examples, any other combinations and subcombinations of the likelihood, severity, and detection scores may be used as desired for positioning and sizing the nodes in risk landscape map 404. Risk landscape map 404 also may indicate which of the nodes is the currently selected node, such as by highlighting the selected node or providing some other distinguishing indication as compared with the other nodes of risk landscape map 404.

Any of the user interfaces may include one or more buttons or other selectable elements for navigating amongst various user interface screens. For example, the FIG. 4 user interface may include one or more buttons 404 for clearing or deselecting a node, for returning to a main menu, and/or for returning to the master risk map that includes a greater set of the nodes (e.g., the map of FIG. 2).

While some features have been described as being associated only with the FIG. 4 user interface, again this is merely an example, and other configurations are possible. For example, indicators 402 and 403, and/or risk landscape map 404, as well as their respective functionality, may also be included in the user interface of FIG. 3. Alternatively or additionally, any or all of the features, indicators, and/or maps may be presented as separate user interfaces and/or in any combination or subcombination desired.

Thus, various example systems, methods, and software have been described that may provide a tool for robustly documenting risks, and for visually communicating their characteristics such as likelihood, severity, detectability, and/or domain, as well as the interrelations between the risks. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present disclosure.

The invention claimed is:

1. An apparatus comprising:
a processor;
a user input device; and
a non-transitory computer-readable medium storing computer-executable instructions for causing the apparatus to:
generate for a specific risk situation a first user interactive interface map of a plurality of nodes, each node identifying a specific risk and a plurality of links between the nodes, the appearance of the links representing the strength of a correlation between each pair of nodes;
determine a characteristic of the risks of a likelihood and severity of each of the risks, such that each of the nodes has a size that depends on at least the likelihood and severity of the risk associated with the respective one of the nodes;
indicate by a graphical representation for each of the nodes the associated risk domain of each of the nodes;
cause the first user interface map to be displayed on a display device;
receive user input from the user device that represents a selection of one of the nodes displayed on the interactive interface map that generates a second user interface that comprises:
the selected one of the nodes;
a subset of a plurality of the nodes comprising those nodes representing risks correlated to the risk represented by the selected one of the nodes; and
a subset of links that interconnect the subset of the nodes to the selected one of the nodes, the appearance of each one of the links represents the determined strength of the correlation between each one of the subset of the nodes to the selected one of the nodes; and
cause the second user interface to be displayed on the display device.

2. The apparatus of claim 1, wherein the computer-executable instructions further comprise: determining a likelihood and a severity of each of the risks, wherein displaying comprises displaying the first user interface such that the nodes are located at positions on the user interface that depend upon the determined likelihood and the determined severity of the respective node.

3. The apparatus of claim 1, wherein the computer-executable instructions further comprise: responsive to receiving a user input selecting one of the nodes, displaying a description of the selected one of the nodes.

4. A method, comprising:
determining, for each of a plurality of pairs of risks, correlations between the respective pair of risks;
generating for a specific risk situation, by a computer, a first user interactive interface map of a plurality of nodes, each node identifying a specific risk and a plurality of displayed links between the nodes, the appearance of the links representing the determined strength of a correlation between each pair of nodes;
determining a characteristic of the risks of a likelihood and severity of each of the risks, such that each of the nodes has a size that depends on at least the likelihood and severity of the risk associated with the respective one of the nodes;
indicating by a graphical representation for each of the nodes the associated risk domain of each of the nodes;
displaying, on a display device, the first user interface map;
receiving user input from the user device representing a selection of one of the nodes displayed on the interactive interface map generating a second user interface comprising:
the selected one of the nodes;
a subset of a plurality of the nodes comprising those nodes representing risks correlated to the risk represented by the selected one of the nodes; and
a subset of links that interconnect the subset of the nodes to the selected one of the nodes, the appearance of each one of the links representing the determined strength of the correlation between each one of the subset of the nodes to the selected one of the nodes; and
causing the second user interface to be displayed on the display device.

5. The method of claim 4, further comprising determining a likelihood and a severity of each of the risks, wherein displaying comprises displaying the first user interface such that the nodes are located at positions on the user interface that depend upon the determined likelihood and the determined severity of the respective node.

6. The method of claim 4, further comprising, responsive to receiving a user input selecting one of the nodes, displaying a description of the selected one of the nodes.

7. A non-transitory computer-readable medium storing computer-executable instructions for causing a computer to:
generate for a specific risk situation a first user interactive interface map of a plurality of nodes, each node identifying a specific risk and a plurality of links between the nodes, the appearance of the links representing the strength of a correlation between each pair of nodes;

determine a characteristic of the risks of a likelihood and severity of each of the risks, such that each of the nodes has a size that depends on at least the likelihood and severity of the risk associated with the respective one of the nodes;

indicate by a graphical representation for each of the nodes that associated risk domain of each of the nodes;

cause the first user interface map to be displayed on a display device;

receive user input from the user device which represents a selection of one of the nodes displayed on the interactive interface map that generates a second user interface that comprises:

the selected one of the nodes;

a subset of a plurality of the nodes comprising those nodes representing risks correlated to the risk represented by the selected one of the nodes; and a subset of links that interconnect the subset of the nodes to the selected one of the nodes, the appearance of each one of the links represents the determined strength of the correlation between each one of the subset of the nodes to the selected one of the nodes; and cause the second user interface to be displayed on the display device.

8. The non-transitory computer-readable medium of claim 7, wherein the computer-executable instructions further comprise: displaying a plurality of input fields configured to receive user input representing attributes of at least some of the risks and at least some of the correlations.

* * * * *